United States Patent
Persson et al.

(10) Patent No.: US 12,049,725 B2
(45) Date of Patent: Jul. 30, 2024

(54) TUMBLE DRYER

(71) Applicant: Electrolux Professional AB (publ), Stockholm (SE)

(72) Inventors: Gunnar Ingemar Persson, Stockholm (SE); Tobias Nilsson, Stockholm (SE)

(73) Assignee: Electrolux Professional AB (publ), Stockholm (SE)

( * ) Notice: Subject to any disclaimer, the term of this patent is extended or adjusted under 35 U.S.C. 154(b) by 1019 days.

(21) Appl. No.: 16/964,336

(22) PCT Filed: Jan. 26, 2018

(86) PCT No.: PCT/EP2018/051913
§ 371 (c)(1),
(2) Date: Jul. 23, 2020

(87) PCT Pub. No.: WO2019/145041
PCT Pub. Date: Aug. 1, 2019

(65) Prior Publication Data
US 2021/0047776 A1     Feb. 18, 2021

(51) Int. Cl.
*D06F 58/22* (2006.01)
*B01D 39/16* (2006.01)
(Continued)

(52) U.S. Cl.
CPC ............. *D06F 58/50* (2020.02); *B01D 39/16* (2013.01); *B01D 46/0006* (2013.01);
(Continued)

(58) Field of Classification Search
CPC .......... D06F 58/50; D06F 34/20; D06F 58/22; D06F 2103/30; D06F 2103/36;
(Continued)

(56) References Cited

U.S. PATENT DOCUMENTS 3,621,585 A * 11/1971 Robertson ............. F26B 21/083
                                                            34/80
3,718,982 A * 3/1973 Deaton ................... D06F 58/22
                                                            219/400
(Continued)

FOREIGN PATENT DOCUMENTS

CA  2768110 A1 * 8/2013 ............. D06F 58/20
DE  2135932       1/1973
(Continued)

OTHER PUBLICATIONS

International Search Report and Written Opinion for PCT/EP2018/051913, dated Oct. 29, 2018, 10 pages.
(Continued)

*Primary Examiner* — John P McCormack
(74) *Attorney, Agent, or Firm* — Pearne & Gordon LLP

(57) ABSTRACT

The present disclosure relates to a tumble dryer (1) with a filter arrangement (12) located in a tumble dryer process air flow (21) for removing lint from process air leaving tumble dryer drum. The filter arrangement comprises a first coarse-mesh filter (25) and a second fine filter (27). A first sensor (41) detects a correct positioning of the first filter in the tumble dryer, and a second sensor (33) detects a pressure drop over a process air flow path comprising the second filter. A control arrangement (45) is configured to initiate a disabling operation which disables the fan arrangement (12), if the first filter is not correctly positioned in the tumble dryer or if the pressure drop over the second filter exceeds a predetermined threshold value.

14 Claims, 2 Drawing Sheets

(51) Int. Cl.
    *B01D 46/00* (2022.01)
    *B01D 46/10* (2006.01)
    *B01D 46/44* (2006.01)
    *B01D 46/46* (2006.01)
    *B01D 46/62* (2022.01)
    *B01D 53/26* (2006.01)
    *D06F 58/50* (2020.01)
    *D06F 34/20* (2020.01)
    *D06F 103/30* (2020.01)
    *D06F 103/36* (2020.01)
    *D06F 103/42* (2020.01)
    *D06F 105/24* (2020.01)
    *D06F 105/30* (2020.01)
    *D06F 105/58* (2020.01)
    *D06F 105/62* (2020.01)

(52) U.S. Cl.
    CPC ..... *B01D 46/0049* (2013.01); *B01D 46/0086* (2013.01); *B01D 46/0095* (2013.01); *B01D 46/10* (2013.01); *B01D 46/446* (2013.01); *B01D 46/46* (2013.01); *B01D 46/62* (2022.01); *B01D 53/265* (2013.01); *B01D 2267/40* (2013.01); *B01D 2267/60* (2013.01); *B01D 2273/30* (2013.01); *B01D 2279/55* (2013.01); *D06F 34/20* (2020.02); *D06F 58/22* (2013.01); *D06F 2103/30* (2020.02); *D06F 2103/36* (2020.02); *D06F 2103/42* (2020.02); *D06F 2105/24* (2020.02); *D06F 2105/30* (2020.02); *D06F 2105/58* (2020.02); *D06F 2105/62* (2020.02)

(58) Field of Classification Search
    CPC ............ D06F 2103/42; D06F 2105/24; D06F 2105/30; D06F 2105/58; D06F 2105/62; B01D 39/16; B01D 46/0006; B01D 46/0049; B01D 46/0086; B01D 46/0095; B01D 46/10; B01D 46/446; B01D 46/46; B01D 46/62; B01D 53/265; B01D 2267/40; B01D 2267/60; B01D 2273/30; B01D 2279/55
    USPC .............................................................. 34/82
    See application file for complete search history.

(56) References Cited

U.S. PATENT DOCUMENTS

| | | | |
|---|---|---|---|
| 5,097,606 A * | 3/1992 | Harmelink | D06F 58/22 34/88 |
| 2006/0075790 A1 * | 4/2006 | Jeon | D06F 39/02 68/210 |
| 2008/0223084 A1 * | 9/2008 | Kuwabara | D06F 25/00 68/20 |
| 2009/0064528 A1 * | 3/2009 | Kim | D06F 58/22 34/524 |
| 2009/0100697 A1 * | 4/2009 | Steffens | D06F 58/22 34/82 |
| 2011/0016736 A1 | 1/2011 | Kim et al. | |
| 2011/0271550 A1 * | 11/2011 | Kim | D06F 58/22 34/480 |
| 2016/0138503 A1 * | 5/2016 | Nam | F02M 35/024 701/110 |
| 2018/0171537 A1 * | 6/2018 | Lee | B08B 3/14 |
| 2020/0370235 A1 * | 11/2020 | Kang | D06F 58/10 |

FOREIGN PATENT DOCUMENTS

| | | |
|---|---|---|
| DE | 3930727 | 3/1991 |
| DE | 29707322 | 8/1998 |
| EP | 2813615 | 12/2014 |
| WO | 2016095970 | 6/2016 |

OTHER PUBLICATIONS

European Communication for application No. 18702223.1 dated Nov. 16, 2022, 4 pages.

* cited by examiner

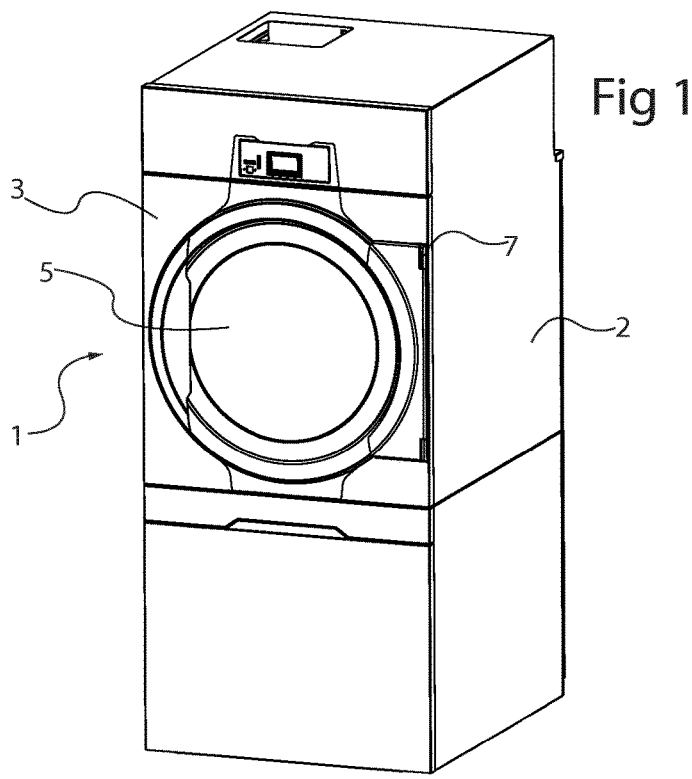
Fig 1
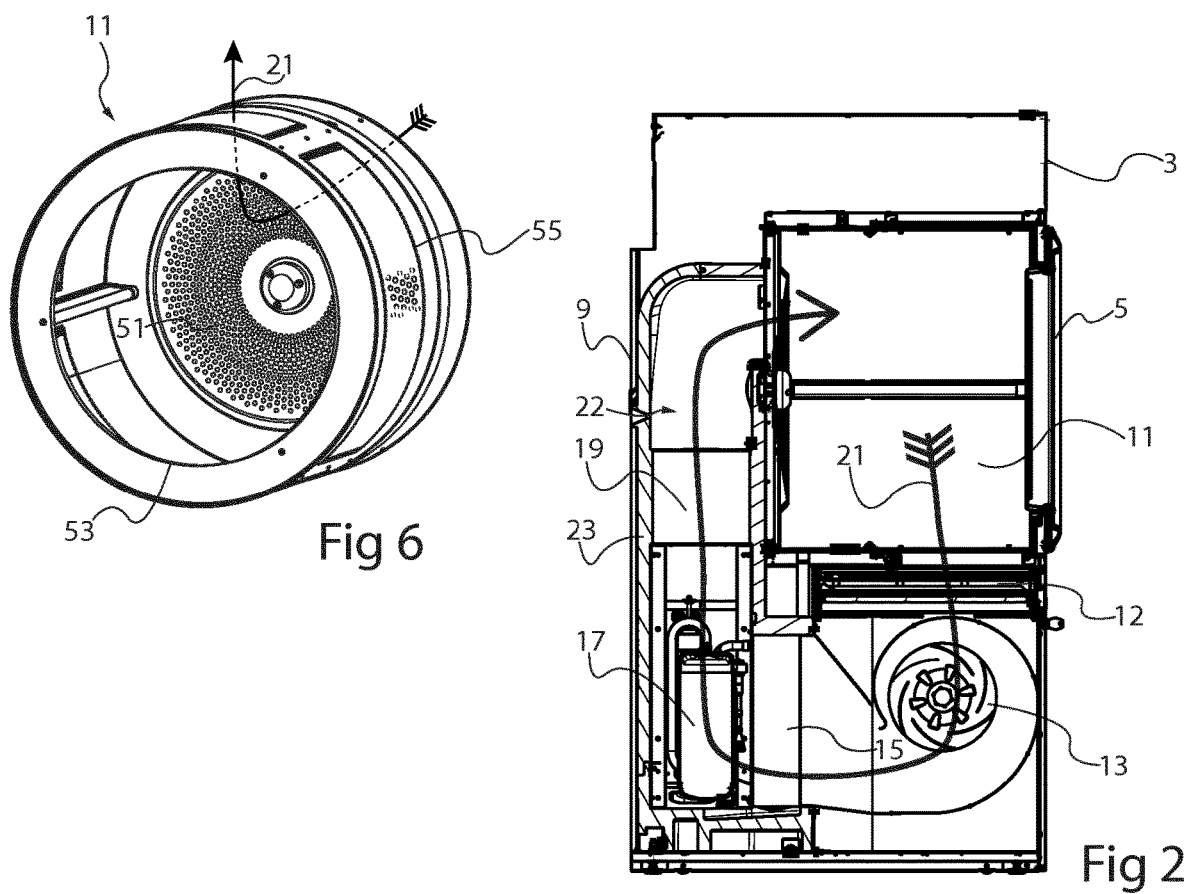
Fig 6
Fig 2

TUMBLE DRYER

FIELD OF THE INVENTION

The present disclosure relates to a tumble dryer comprising a rotatable drum, a fan arrangement configured to force a flow of process air through the drum, and a filter arrangement located in the process air flow for removing lint from the process air after leaving the drum.

TECHNICAL BACKGROUND

Such a tumble dryer is described for instance in EP-3118365-A1. A general problem with tumble dryers of this kind is to achieve reliability, especially during long-term, intensive use, such as when used professionally.

SUMMARY OF THE INVENTION

One object of the present disclosure is therefore to provide a tumble dryer with improved long-term use reliability. More specifically, in a tumble dryer of the initially mentioned kind, the filter arrangement comprises a first coarser filter and a second finer filter. A first sensor is configured to detect a correct positioning of the first filter, and a second sensor is configured to detect a pressure drop over a flow path comprising the second filter. A control arrangement initiates a disabling operation, disabling the fan arrangement, if the first filter is not correctly positioned in the tumble dryer or if the pressure drop over the second filter exceeds a predetermined threshold value. This makes sure that units downstream of the filter to a great extent are protected from lint particles of different sizes at all times. This protects for instance an evaporator from lint which could otherwise clog fine structures and require difficult service operations if the tumble dryer is of a heat pump type. The same applies to condenser type tumble dryers. This results in a more reliable and efficient tumble dryer.

The first filter may be a filter comprising openings with sizes in the range 50-200 μm, such as a polyester filament filter. The second filter may be adapted to remove 80% of particles with a size down to 4 μm, for instance a HEPA filter.

The first sensor may comprise a reed switch, which is activated by a permanent magnet, attached to the first filter when the first filter is correctly installed in the tumble dryer. The first filter may be inserted in guides made in a non-ferromagnetic material, and the reed switch may be located at the outer side of one of the guides. This allows the presence of the magnet to be detected by the reed switch while the reed switch is out of the way when the first filter is inserted in the tumble dryer.

The second sensor may measure the pressures at a location between the drum and the filter arrangement and at a location between the filter arrangement and the fan arrangement. Alternatively, the second sensor may measure the pressures at a location between the first filter and the second filter and at a location between the filter arrangement and the fan arrangement.

The first filter may be slideable in and out of the tumble dryer, to allow an end user to easily clean the filter, while the second filter is located behind a wall portion to make sure that it is replaced by authorized service personnel. The first filter may be located under the drum and may be slideable in a horizontal direction.

This filter arrangement is particularly useful in a tumble dryer comprising a heat pump device with an evaporator, extracting water from the process air, and wherein the filter arrangement is located upstream in the process air flow as seen from the evaporator, after the tumble dryer drum.

The disabling operation may disable the fan arrangement immediately if the first filter is not correctly positioned in the tumble dryer, and may disable the fan arrangement after a predetermined time of operation if the pressure drop over the second filter exceeds a predetermined threshold value. While protecting sensitive parts from lint when the first filter is cleaned this allows some operation time when the second filter begins to be clogged. If the pressure drop over the second filter exceeds a predetermined threshold value, a filter replacement notification may be produced to make it probable that a replacement second filter is ordered and delivered before the tumble dryer is disabled. The tumble dryer may be a high-capacity dryer, wherein process air outlet openings are provided in a cylindrical peripheral wall of the drum.

BRIEF DESCRIPTION OF THE DRAWINGS

FIG. 1 shows a perspective view of a tumble dryer.
FIG. 2 illustrates a cross section through a tumble dryer with a heat pump arrangement.
FIG. 6 shows a tumble dryer drum.

DETAILED DESCRIPTION

Figure 3:
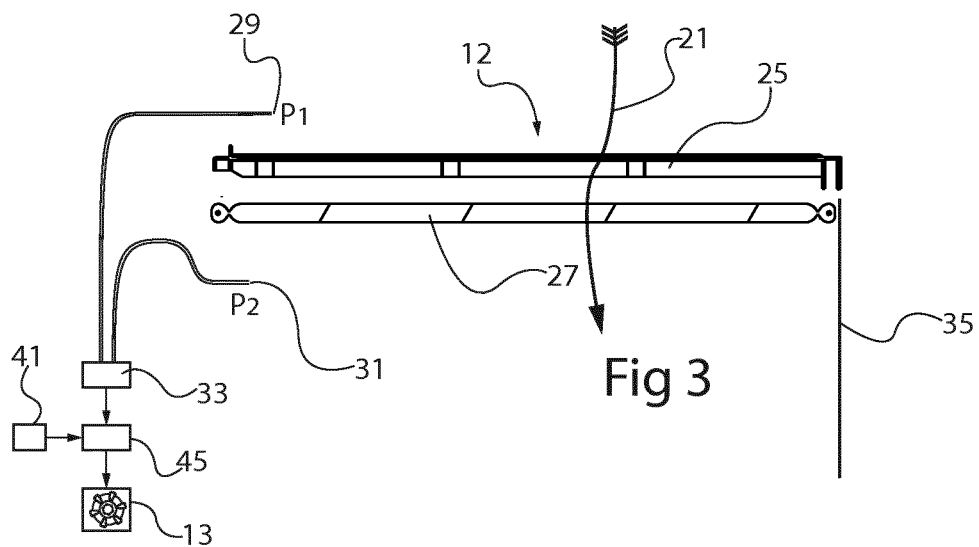
FIG. 3 illustrates schematically a side view of a filter arrangement.

The present disclosure relates generally to tumble dryers and is mostly useful in tumble dryers which employ a closed loop process air flow, where a great part of the process air flow is recirculated a number of times through a tumble dryer drum.

Such a tumble dryer may be a tumble dryer provided with a heat pump in order to achieve energy-efficient drying of laundry, as is illustrated in FIGS. 1 and 2. Another example would be a condenser-type tumble dryer.

In FIG. 1, the tumble dryer 1 has a housing 2 with a front side 3 which is provided with a door 5 or hatch, attached to the front side 3 with hinges 7, which provides access to the tumble dryer drum behind the door 5 where wet laundry can be loaded.

FIG. 2 illustrates a cross section through a tumble dryer with a heat pump arrangement. In a heat pump tumble dryer, process air drying the laundry can circulate mostly in a closed loop within the outer enclosure of the tumble dryer, although some exchange of air with the outside may take place. FIG. 2 shows components of such a tumble dryer as well as a process air flow path 21. As mentioned, the tumble dryer comprises a drum 11 in which wet laundry is placed. While the drum 11 rotates, a flow 21 of relatively dry process air is fed therethrough. The flow is provided by a fan 13 or blower, which in the illustrated case is located in a space below the drum 11.

The illustrated tumble dryer 1 is a high-capacity tumble dryer mainly intended for professional or shared use. Therefore, in order to achieve a high flow through the drum 11, the drum, as shown in FIG. 6, is provided with process air inlet openings in its rear circular wall 51 as seen from its front, which is provided with an opening 53 where laundry can be loaded. Process air outlet openings are provided in a cylindrical peripheral wall 55 of the drum, particularly in the front portion thereof. For instance, 90% of the outlet openings may be located in the front half of the drum to make sure that most of the process air flow 21 passes through a significant part of the drum interior space.

The above configuration allows the provision of a significant outlet opening area as compared to tumble dryers where a process air outlet is provided in connection with the tumble dryer door.

Again, with reference to FIG. 2, the tumble dryer includes a heat pump arrangement with an evaporator 15, a compressor 17, a condenser 19, and an expansion valve (not shown). A refrigerant medium is forced through the heat pump arrangement by the compressor 17, and gathers energy in the evaporator 15 which is released in the condenser 19, as is well known per se.

As illustrated in FIG. 2, an air flow 21 is achieved where hot, humid air is extracted from the perforated drum 11 by means of the fan 13. The air flow passes a filter arrangement 12 before reaching the fan 13 and arrives at the evaporator 15, which cools the air flow such that moisture therein condenses into liquid water. This water is collected in the bottom section of the tumble dryer and may be drained therefrom through a tube (not shown). A compressor 17 is provided to obtain the heat pump flow.

The process air flow 21, which is now cooler and contains less water, is passed to the rear section of the tumble dryer and subsequently passes the condenser 19, which heats the air again. Then, the heated, dry air is reintroduced into the drum 11 where it is again capable of absorbing water from the laundry therein. The heat pump may be enclosed in an insulating shell 23, for instance made of expanded polypropylene, EPP. This improves the energy efficiency of the tumble dryer, as less heat may leak to the ambient space.

The present disclosure concerns providing efficient filtering of the process air after leaving the drum 11. When leaving the drum 11, the process air flow 21 usually comprises some lint emitted by the laundry in the drum, and this lint should preferably be removed from the process air as much as possible to avoid that the lint clogs the evaporator 15 where the process air 21 passes through fine passages to be cooled and to be relieved of water content. A similar need exists in condenser-type tumble dryers.

FIG. 3 illustrates schematically a side view of a filter arrangement 12, intended according to the present disclosure for a tumble dryer of the above-described type.

The filter arrangement 12 comprises a first coarse filter 25 and a second fine filter 27. The first filter 25 removes the bulk of the lint from the process air flow 21, and the second filter 27 removes some fine particles that passes through the first filter 25. The terms coarse and fine are here used in in a relative sense, meaning that the coarse filter is adapted to catch larger particles than the fine filter. Thus, the first filter is adapted to remove considerable amounts of larger particles, ranging from a number of tenths of micrometers and upwards, while the fine filter is intended to remove a smaller amount (in terms of weight) of smaller particles, with sizes ranging from a few micrometers and upwards.

Figure 4:
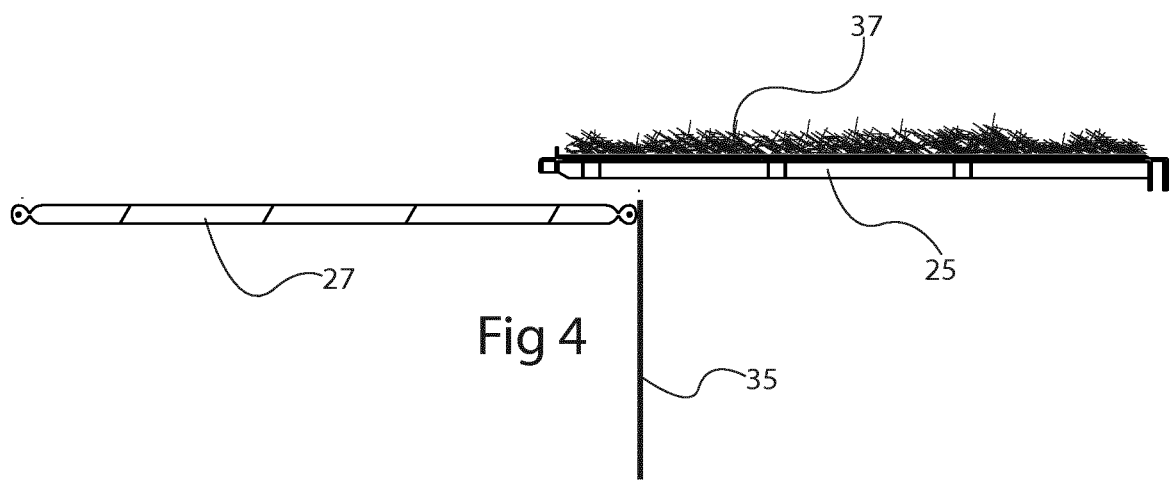
FIG. 4 shows the side view of FIG. 3 with a pulled-out coarse filter.

Typically, the first filter 25 presents a large surface with a mesh comprising openings, for instance with sizes in the range 50-200 μm, e.g. 105 μm. The first filter may comprise a polyester filament mesh attached to a polypropylene frame, for instance. The first filter 25 is slideable in and out of the tumble dryer 1, such that when pulled out, as illustrated in FIG. 4, the user can remove lint 37 collected by the first filter 25. This operation turns off the fan arrangement 13, such that lint-laden process air is not moved to the second filter 27 in this state. As illustrated, the first filter may be located under the drum and may be slideable in a horizontal direction, and there is no need to open the door 5 to be able to carry out this operation.

With reference again to FIG. 3, the second filter 27, may typically be a thick a fiber-based filter, capable of removing small particles, and may even include so called HEPA—(High Efficiency Particulate Air) filters. More generally, a filter capable of removing about 80% of particles with a size down to 4 μm is considered. The second filter is typically intended to be replaced by service personnel after about 500 hours of use. In order to avoid that the end user tampers with the second filter 27, it is located behind a front wall portion 35 which is removed during service. Typically, the second filter 27 is designed to catch smaller particles that may occasionally pass the first filter 25.

In order to ensure sufficient filtering of the process air, there is provided a first sensor and a second sensor. The first sensor 41, that will be discussed in greater detail later, is configured to detect a correct positioning of the first filter 25.

The second sensor 33 is configured to detect a pressure drop over a flow path comprising the second filter 27. This may be done by measuring the pressure $P_1$ with a first probe 29 at a location between the drum 11 and the filter arrangement 12, and the pressure $P_2$ with a probe 31 at a location between the filter arrangement 12 and the fan arrangement 13. Those probes may simply be conduits 29, 31 connecting those locations to the second sensor 33. The second sensor 33 itself may be a differential sensor, outputting the differential pressure $P_1$-$P_2$, or a pressure switch outputting an indication if this pressure exceeds a predetermined threshold value.

Alternatively, the pressures at a location between the first filter 25 and the second filter 27 and at a location between the filter arrangement 12 and the fan arrangement 13 are measured.

The first sensor 41 may be arranged in a number of ways including a simple contact switch that is activated when the first filter is pushed in to the location illustrated in FIG. 3. The present disclosure suggests using a reed switch 41 to this end. Other alternatives would be an inductive sensor, or the like.

Figure 5:
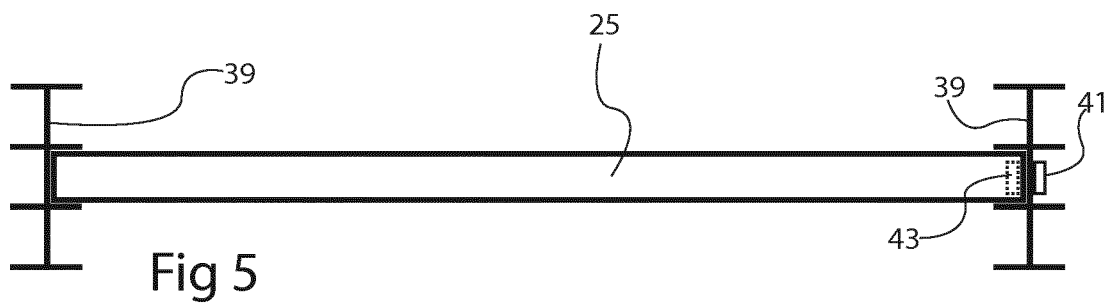
FIG. 5 shows schematically a front view of the guide arrangement suspending the coarse filter.

FIG. 5 shows schematically a front view of the guide arrangement suspending the first filter 25. As shown, the first filter 25 is inserted in guides 39, which may be made in a non-ferromagnetic material, such as plastic or from extruded aluminum profiles. As shown, a reed switch 41 may be located at the outer side of one of the guides 39 as seen from the first filter. A permanent magnet 43 is attached to and optionally hidden in the first filter 25. The reed switch 41 is activated by the permanent magnet 43 when the first filter 25 is correctly installed in the tumble dryer and the permanent magnet 43 is located directly in front of the reed switch 41. The reed switch may thus be hidden and cannot obstruct insertion of the first filter 25.

The first and second sensors 33, 41 are connected to a control arrangement 45 (cf. FIG. 3), which is configured to initiate a disabling operation if the first filter 25 is not correctly positioned in the tumble dryer or if the pressure drop over the second filter 27 exceeds a predetermined threshold value. The disabling operation disables the fan arrangement 13.

Typically, the disabling operation disables the fan arrangement 13 immediately if the first filter is not correctly positioned in the tumble dryer. This is done to ensure that the second filter 27 does not become clogged by large quantities of lint when a user pulls the first filter 25 out.

If the pressure drop is about to become too high, indicating that the second filter 27 will soon need be replaced, it may be preferred to start a timer in the control arrangement 45, and to disable the fan arrangement after a predetermined time of operation if the pressure drop over the second filter exceeds a predetermined threshold value. It may be preferred to issue a filter replacement notification when the timer is started, e.g. by lighting an indicator lamp, or if possible send a notification to a service center. This allows the tumble dryer to be operational for some time while awaiting service personnel.

The present disclosure is not restricted to the above-described embodiment, and may be varied and altered in different ways within the scope of the appended claims.

The invention claimed is:

1. A tumble dryer comprising:
a rotatable drum,
a fan arrangement configured to force a flow of process air through the drum,
a filter arrangement located in the process air flow for removing lint from the process air after leaving the drum, the filter arrangement comprising a first coarse filter and a second fine filter,
a first sensor configured to detect a correct positioning of the first filter,
a second sensor configured to detect a pressure drop over a flow path comprising the second filter, wherein the second sensor measures pressures at a location between the first filter and the second filter and at a location between the filter arrangement and the fan arrangement, and
a control arrangement configured to initiate a disabling operation, which disables the fan arrangement if the first filter is not correctly positioned in the tumble dryer, and disables the fan arrangement if the pressure drop over the second filter exceeds a predetermined threshold value.

2. The tumble dryer according to claim 1, wherein the first filter is a mesh filter comprising openings with sizes in the range 50-200 μm.

3. The tumble dryer according to claim 1, wherein the first filter is a polyester filter.

4. The tumble dryer according to claim 1, wherein the second filter is adapted to remove 80% or more of particles with sizes down to 4 μm.

5. The tumble dryer according to claim 1, wherein the second filter is a HEPA filter.

6. The tumble dryer according to claim 1, wherein the first sensor is a reed switch, which is activated by a permanent magnet, attached to the first filter when the first filter is correctly installed in the tumble dryer.

7. The tumble dryer according to claim 6, wherein the first filter is inserted in guides made in a non-ferromagnetic material, and wherein the reed switch is located at the outer side of a said guides.

8. The tumble dryer according to claim 1, wherein the first filter is slideable in and out of the tumble dryer, while the second filter is located behind a wall portion.

9. The tumble dryer according to claim 8, wherein the first filter is located under the drum and is slideable in a substantially horizontal direction.

10. The tumble dryer according to claim 1, wherein the tumble dryer comprises a heat pump device having an evaporator extracting water from the process air, and wherein the filter arrangement is located upstream in the process air flow as seen from the evaporator.

11. The tumble dryer according to claim 1, wherein process air outlet openings are provided in a cylindrical peripheral wall portion of the drum.

12. A tumble dryer comprising:
a rotatable drum,
a fan arrangement configured to force a flow of process air through the drum,
a filter arrangement located in the process air flow for removing lint from the process air after leaving the drum, the filter arrangement comprising a first coarse filter and a second fine filter,
a first sensor configured to detect a correct positioning of the first filter,
a second sensor configured to detect a pressure drop over a flow path comprising the second filter, wherein the second sensor measures pressures at a location between the first filter and the second filter and at a location between the filter arrangement and the fan arrangement, and
a control arrangement configured to initiate a disabling operation, which disables the fan arrangement if the first filter is not correctly positioned in the tumble dryer, and disables the fan arrangement if the pressure drop over the second filter exceeds a predetermined threshold value,
wherein the disabling operation disables the fan arrangement immediately if the first filter is not correctly positioned in the tumble dryer, and disables the fan arrangement after a predetermined time of operation if the pressure drop over the second filter exceeds a predetermined threshold value.

13. The tumble dryer according to claim 12, wherein if the pressure drop over the second filter exceeds a predetermined threshold value, a filter replacement notification is produced.

14. A tumble dryer comprising:
a rotatable drum,
a fan arrangement configured to force a flow of process air through the drum,
a filter arrangement located in the process air flow for removing lint from the process air after leaving the drum, the filter arrangement comprising a first coarse filter and a second fine filter,
a first sensor configured to detect a correct positioning of the first filter, and
a second sensor configured to detect a pressure drop over a flow path comprising the second filter, wherein the second sensor measures pressures at a location between the first filter and the second filter and at a location between the filter arrangement and the fan arrangement.

* * * * *